US010327036B2

(12) United States Patent
Werth et al.

(10) Patent No.: US 10,327,036 B2
(45) Date of Patent: Jun. 18, 2019

(54) SYSTEMS AND METHODS FOR IMPLEMENTING A TIMELINE SCROLLER TO NAVIGATE MEDIA ASSET IDENTIFIERS

(71) Applicant: Rovi Guides, Inc., Santa Clara, CA (US)

(72) Inventors: Ryan Werth, San Francisco, CA (US); Ofer Vaisler, Sunnyvale, CA (US); Alicia Daiuto, Santa Clara, CA (US); Vasyl Kolosovskyi, Odessa (UA); Stefan Andrew Miller, Sunnyvale, CA (US); Hiedi Lynn Utley, San Mateo, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 14/998,121

(22) Filed: Dec. 23, 2015

(65) Prior Publication Data
US 2017/0142491 A1   May 18, 2017

Related U.S. Application Data

(60) Provisional application No. 62/256,520, filed on Nov. 17, 2015.

(51) Int. Cl.
*H04N 21/482* (2011.01)
*G06F 3/0482* (2013.01)
(Continued)

(52) U.S. Cl.
CPC ....... *H04N 21/4821* (2013.01); *G06F 3/0482* (2013.01); *G06F 3/0488* (2013.01);
(Continued)

(58) Field of Classification Search
CPC ............ H04N 21/4821; H04N 21/4586; G06F 3/0482; G06F 3/04855; G06F 3/0488
See application file for complete search history.

(56) References Cited

U.S. PATENT DOCUMENTS 6,239,794 B1   5/2001  Yuen et al.
6,388,714 B1   5/2002  Schein et al.
(Continued)

OTHER PUBLICATIONS

"Daily tip: Scrolling on iPhone and iPad", by Georgia, Dec. 3, 2010, http://www.imore.com/beginner-tip-scrolling-101; downloaded Jan. 10, 2017, 25 pages.
(Continued)

*Primary Examiner* — Benjamin R Bruckart
*Assistant Examiner* — Susan X Li
(74) *Attorney, Agent, or Firm* — Haley Guiliano LLP

(57) ABSTRACT

Systems and methods are provided herein to ease the process of navigating media asset identifiers. Control circuitry may generate a timeline scroller that does not obscure media asset identifiers for simultaneous display with the media asset identifiers. When a user makes contact with the timeline scroller (e.g., by touching it with a finger on a touch screen device), control circuitry may responsively generate for display an indicator of a time corresponding with the point where the contact is made. Control circuitry may cause this indicator to be updated as a user scrolls along the timeline scroller. Control circuitry may refrain from updating the listings to correspond with the time until the user discontinues making contact with the timeline scroller (e.g., by removing the finger from the touch screen).

18 Claims, 9 Drawing Sheets

(51) Int. Cl.
   *G06F 3/0485* (2013.01)
   *G06F 3/0488* (2013.01)
   *H04N 21/458* (2011.01)
   *H04N 5/445* (2011.01)
   *H04N 21/462* (2011.01)

(52) U.S. Cl.
   CPC ..... *G06F 3/04855* (2013.01); *H04N 5/44543* (2013.01); *H04N 21/4586* (2013.01); *H04N 21/4622* (2013.01); *H04N 21/482* (2013.01)

(56) References Cited

U.S. PATENT DOCUMENTS

| | | | |
|---|---|---|---|
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,719,870 B1* | 5/2014 | Davies | H04N 5/44543 |
| | | | 725/39 |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2010/0037153 A1* | 2/2010 | Rogers | G06F 3/0481 |
| | | | 715/758 |
| 2010/0153885 A1 | 6/2010 | Yates | |
| 2010/0218129 A1 | 8/2010 | Fahey et al. | |
| 2011/0234504 A1 | 9/2011 | Barnett et al. | |
| 2011/0239149 A1 | 9/2011 | Lazo et al. | |
| 2012/0060188 A1* | 3/2012 | Stallings | H04N 21/42209 |
| | | | 725/44 |
| 2013/0185642 A1* | 7/2013 | Gammons | G06F 3/0482 |
| | | | 715/733 |
| 2016/0170629 A1* | 6/2016 | Gabryjelski | G06F 3/04855 |
| | | | 715/786 |
| 2016/0239809 A1* | 8/2016 | Vetrov | G06F 3/03543 |

OTHER PUBLICATIONS

"Scroll Path | jQuery plugin to define custom scroll paths", Jun. 30, 2012, http://jquer.in/jquery-plugins-for-awesome-scrolling-and-scrollbars-on-websites/scroll-path/, downloaded Jan. 10, 2017, 2 pages.

Time Machine—Frequently Asked Questions 15A. How do I use the (not so intuitive Time Machine display?, Aug. 13, 2013, http://pondini.org/TM/15A.html, downloaded Jan. 10, 2017, 4 pages.

\* cited by examiner

SYSTEMS AND METHODS FOR IMPLEMENTING A TIMELINE SCROLLER TO NAVIGATE MEDIA ASSET IDENTIFIERS

CROSS-REFERENCE TO RELATED APPLICATIONS

This patent application claims the benefit of U.S. Provisional Patent Application No. 62/256,520, filed Nov. 17, 2015, the disclosure of which is hereby incorporated by reference herein in its entirety.

BACKGROUND

In present media guidance applications, navigating media asset identifiers corresponding to time periods other than a present time period is cumbersome. Users often have to manually select a time period, such as by manually clicking a button corresponding to future times on a schedule matrix until a desired time is reached.

SUMMARY

Systems and methods are provided herein to ease the process of navigating media asset identifiers. Control circuitry may generate a timeline scroller that does not obscure media asset identifiers for simultaneous display with the media asset identifiers. When a user makes contact with the timeline scroller (e.g., by touching it with a finger on a touch screen device), control circuitry may responsively generate for display an indicator of a time corresponding with the point where the contact is made. Control circuitry may cause this indicator to be updated as a user scrolls along the timeline scroller. Control circuitry may refrain from updating the listings to correspond with the time until the user discontinues making contact with the timeline scroller (e.g., by removing the finger from the touch screen).

In some embodiments, control circuitry may, further in response to detecting that the user has scrolled to the second position, cause the second indicator to be displayed with a higher level of prominence than the first indicator is displayed. Control circuitry may further determine either that a period of time has elapsed since a time that user contact with the first position was last detected, or that the user has scrolled a threshold distance from the first position, and may responsively cause the first indicator to no longer be displayed. Thus, as a user scrolls, control circuitry may cause the first indicator to fade away.

In some embodiments, the timeline scroller corresponds to a first period of time (e.g., a given 24 hour broadcast schedule period). Control circuitry may generate for display a selectable option for the timeline scroller to correspond to a different period of time than it presently corresponds to (e.g., a next 24 hour broadcast schedule period), receive a user selection of the selectable option, and, in response to receiving the user selection, cause the timeline scroller to correspond to the different period. For example, the next 24 hour broadcast period may be loaded. In some embodiments, the plurality of media asset identifiers corresponding to the broadcast time additionally correspond to the period of time that the timeline scroller presently corresponds to. Control circuitry may generate for display a different plurality of media asset identifiers corresponding to the broadcast time in the different period of time.

In some embodiments, control circuitry may, further in response to detecting user contact with a touch screen at a first position on which the timeline scroller is displayed, cause the first position of the timeline scroller to be displayed more prominently than other positions of the timeline scroller are displayed. For example, if the timeline scroller is a series of dots, a dot corresponding to the first position may have a higher level of opacity than dots that are not near the first position. In some embodiments, control circuitry may, further in response to detecting that the user has scrolled to the second position, cause the prominence of the first position of the timeline scroller to be reduced to a uniform prominence with the other positions of the timeline scroller. Thus, following from the example above, an opacity of a dot of the first position may be reduced as a user scrolls away from the first position.

In some embodiments, control circuitry may, further in response to detecting that the user has scrolled to the second position, cause the prominence of the second position of the timeline scroller to be displayed more prominently than the other positions of the timeline scroller and the first position of the timeline scroller are displayed. Thus, following from the above, as a user scrolls to the second position, dots may gain opacity as the user scrolls them, and ultimately dots corresponding to the second position may have an opacity that is greater than an opacity of other dots of the timeline scroller.

In some embodiments, control circuitry may refrain from updating the display of the media asset identifiers to correspond to the third media asset broadcast time until the release of the user contact is detected. Thus, as a user scrolls along the timeline scroller, control circuitry may refrain from updating broadcast listings from those relating to the originally displayed broadcast time. When control circuitry detects that a user has finally released contact from the timeline scroller (e.g., because the user has found a time for which he would like to see broadcast listings), control circuitry may then update the broadcast listings to reflect those corresponding to a time selected using the timeline scroller.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DESCRIPTION

Figure 1:
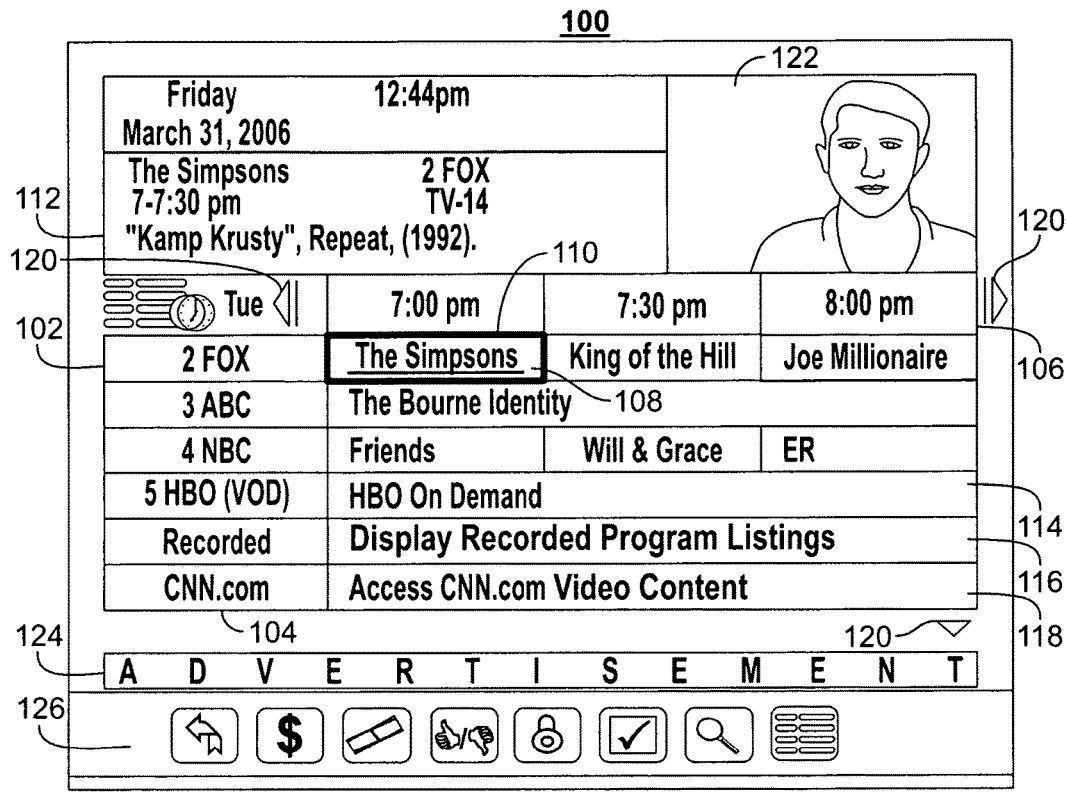
FIG. 1 shows an illustrative embodiment of a display screen that may be used to provide media guidance application listings and other media guidance information, in accordance with some embodiments of the disclosure.

Systems and methods are provided herein to ease the process of navigating media asset identifiers. Control circuitry may generate a timeline scroller that does not obscure media asset identifiers for simultaneous display with the media asset identifiers. When a user makes contact with the timeline scroller (e.g., by touching it with a finger on a touch screen device), control circuitry may responsively generate for display an indicator of a time corresponding with the point where the contact is made. Control circuitry may cause this indicator to be updated as a user scrolls along the timeline scroller. Control circuitry may refrain from updating the listings to correspond with the time until the user discontinues making contact with the timeline scroller (e.g., by removing the finger from the touch screen).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
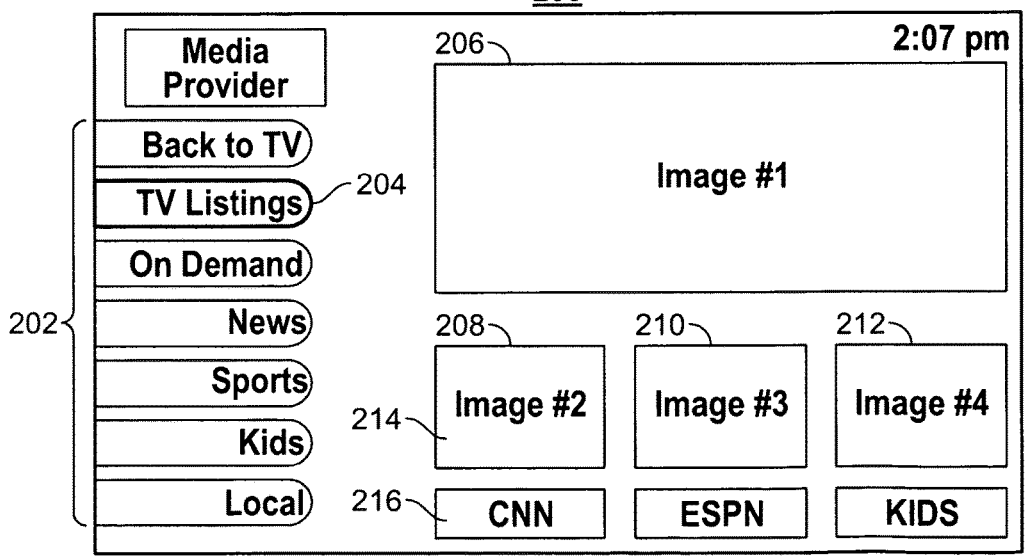
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data display, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
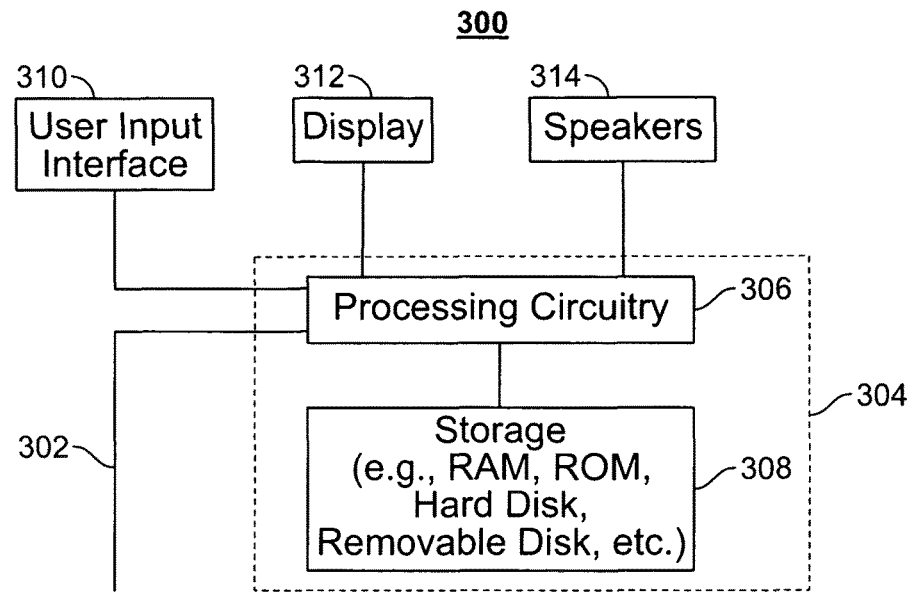
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-sore, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
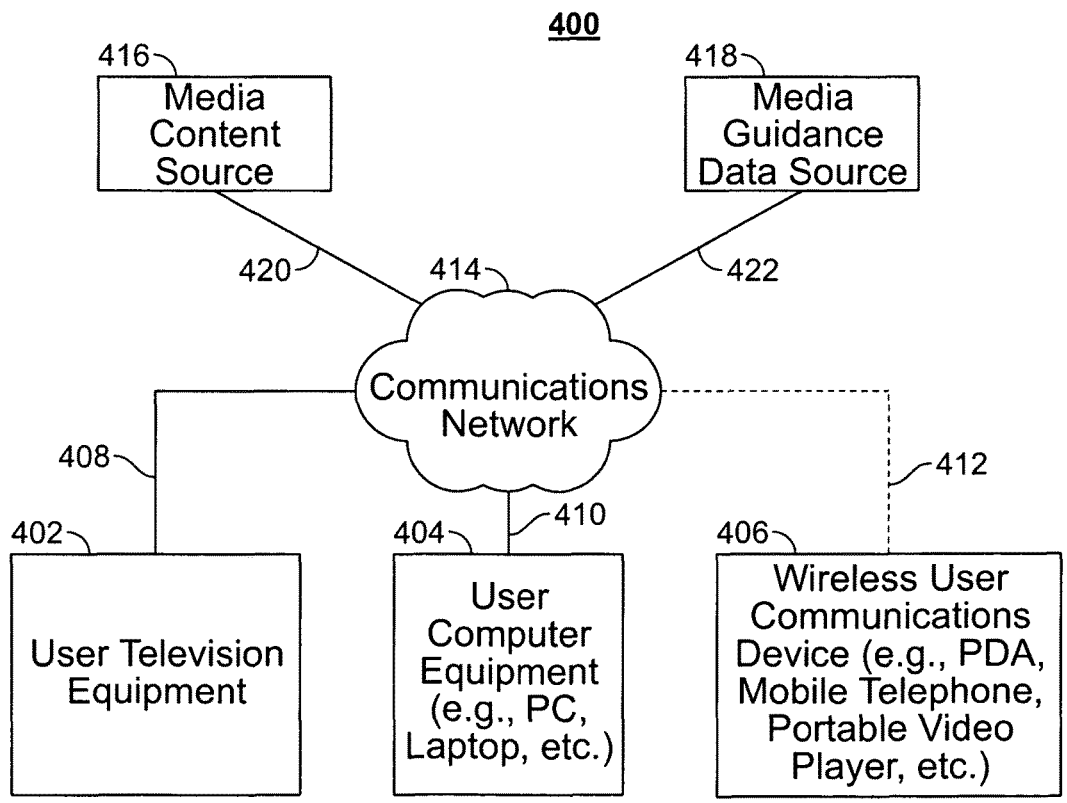
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equiptment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

Figure 5:
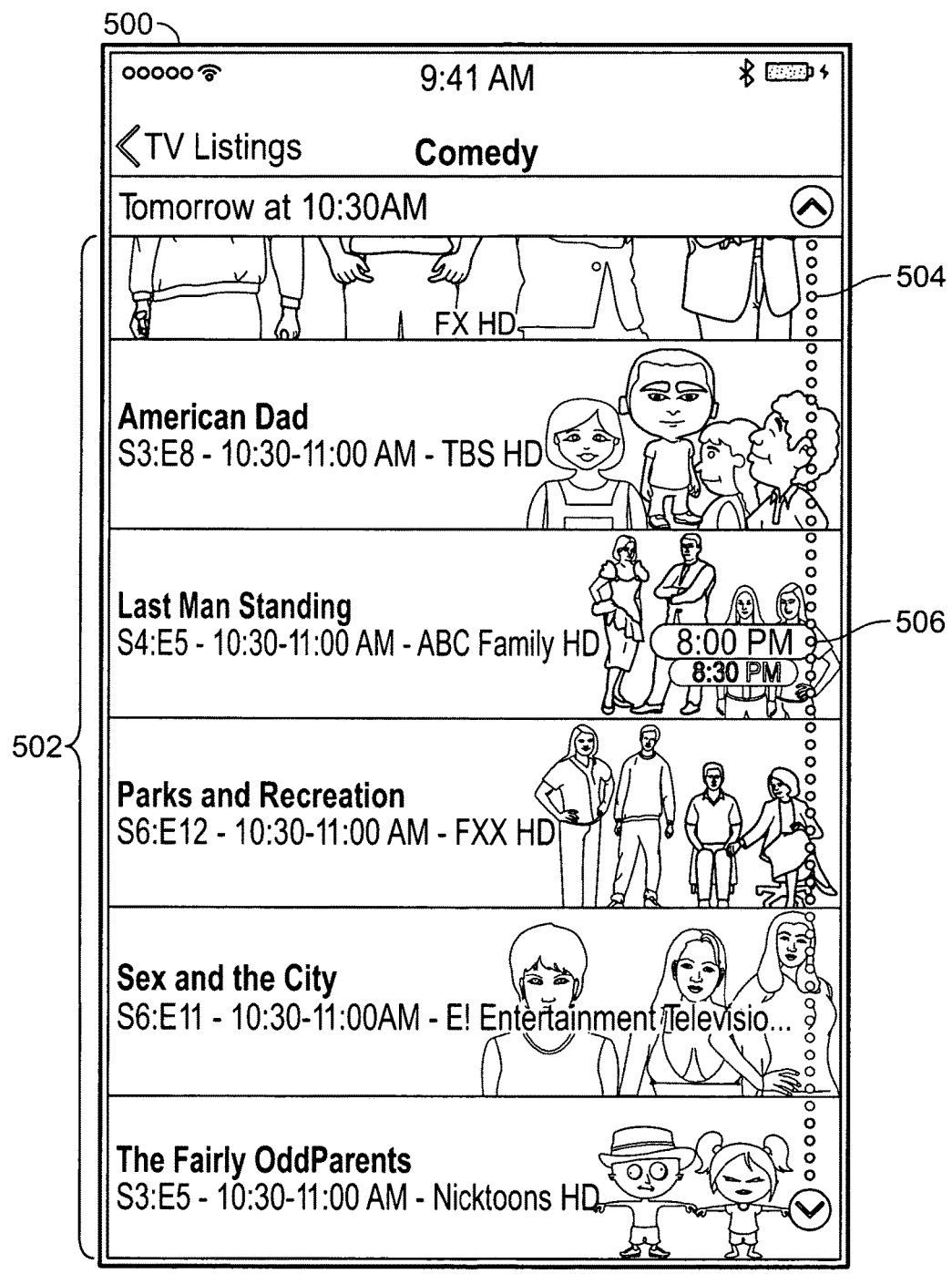
FIG. 5 depicts a user equipment configured to implement a timeline scroller for navigating media asset identifiers, in accordance with some embodiments of this disclosure.

FIG. 5 depicts a user equipment configured to implement a timeline scroller for navigating media asset identifiers, in accordance with some embodiments of this disclosure. In FIG. 5, user equipment 500 is depicted. User equipment 500 may comprise the functionality of any or all of user television equipment 402, user computer equipment 404, and wireless user communications device 406. Control circuitry 304, implemented on user equipment 500, may generate for display media asset listings 502. Additionally, control circuitry 304 may generate for simultaneous display timeline scroller 504, which may be used to navigate broadcast times for which media asset identifiers are to be displayed. Control circuitry 304 may additionally generate for simultaneous display time indicator 506, which may indicate a time corresponding with a position on which a body part of a user (e.g., a finger) is contacting the timeline scroller. Control circuitry 304 may cause a display of any of media asset identifiers 502, timeline scroller 504, time indicator 506, and any other item through display 312.

In some embodiments, control circuitry 304 may generate for simultaneous display a plurality of media asset listings corresponding to a first broadcast time and a timeline scroller. For example, a user of user equipment 500 may use the media guidance application to access media asset listings 502, and, responsively, control circuitry 304 may generate for display media asset listings 502. Control circuitry 304 may, for simultaneous display with media asset identifiers 502, generate for display timeline scroller 504. Timeline scroller 504 may be a visual indicator of a timeline corresponding with a period of time. In a preferred embodiment, timeline scroller may correspond to a twenty-four hour period of time, where the top of the timeline scroller corresponds with a time 00:00, and a bottom of the timeline scroller corresponds with a time 24:00, for a given day. Timeline scroller 504, however, need not be associated with a single given day, and any bounded or unbounded period of time is within the scope of this disclosure. Moreover, while timeline scroller 504 is drawn vertically in FIG. 5, any orientation is within the scope of this disclosure.

In some embodiments, control circuitry 304 may detect user contact at a first position on which the timeline scroller is displayed. For example, user equipment 500 may include a touch screen (or other user input interface 310). Control circuitry 304 may detect user contact by way of user input interface 310, which, in this case, is a touch screen, and may determine that the point of contact is at a same point where a portion (e.g., a first position) of timeline scroller 504 is displayed.

In some embodiments, in response to detecting the user contact at the first position, and prior to detecting a release of user contact, control circuitry 304 may generate for display an indicator of a second broadcast time corresponding to the first position. For example, as depicted in FIG. 5, about halfway down the timeline scroller, an indication of the time of 8:00 PM is displayed in time indicator 506. This may be the case because control circuitry 304 has detected that the position of the timeline scroller that a user has placed his finger on corresponds with the time 8:00 pm. Control circuitry 304 may detect that a user has scrolled to a second position on, e.g., the touch screen on which the timeline scroller is displayed, and may responsively generate for display a second indicator of a third broadcast time corresponding to the second position. As an example, a user may scroll his finger downward, and as the user scrolls downward, time indicator 506 may indicate a time corresponding with the scrolled-to portion of timeline scroller 504.

In some embodiments, control circuitry 304 may detect the release of user contact from user input interface 310 (e.g., a touch screen of user equipment 500), and may responsively update the display of media asset identifiers 502 to correspond to the broadcast time indicated by time indicator 506. Control circuitry 304 may refrain from updating media asset identifiers 502 from their original display until such a time that control circuitry 304 detects, e.g., a removal of a user's finger from timeline scroller 504.

In some embodiments, timeline scroller 504 may comprise a series of dots, such as those depicted in FIG. 5. Control circuitry 304 may dictate a default dot treatment be at or around 30% opacity. This may be changed by an application editor or a user. Control circuitry 304 may cause a dot that is presently active, in the sense that user contact is detected by control circuitry 304, to have a higher opacity, such as a 70% opacity. This higher opacity may also be altered by an editor or a user. Control circuitry 304 may cause dots adjacent to an active dot (e.g., a next dot above and below an active dot, or a next several dots above and below an active dot) to be at an opacity that is higher than the default opacity, but lower than the opacity of an active dot (e.g., 45% opacity). The opacity for adjacent to active dots is similarly adjustable by a user and/or editor. The use of dots in this disclosure is merely illustrative; any series of symbols, or a contiguous line, may be used to represent timeline scroller 504. Moreover, while opacity is discussed in this disclosure, any means of making timeline scroller 504 more prominent or less prominent in any given portion of timeline scroller 504 is within the scope of this disclosure.

In some embodiments, media asset identifiers 502 may be scrollable (e.g., by a user swiping up or down on the media asset identifiers). Because the media asset identifiers 502 each correspond to a broadcast time, the media asset identifiers correspond to a given dot of timeline scroller 504. To this end, control circuitry 304 may cause the opacity of one or more dots of timeline scroller 504 to change in the same manner as described above, except in response to a user scrolling media asset identifiers 502, rather than scrolling timeline scroller 504.

As described above, in some embodiments, control circuitry 304 may only enable a user to scroll through a limited amount of content at a time (e.g., 12 hours on a small screen, 24 hours on a large screen) for the purpose of ensuring the timeline scroller has a logical correlation with a discrete portion of time. Control circuitry 304 may enable a user to scroll other periods of time using timeline scroller 504 by generating for display a "load next [period of time]" option, such as a "load next 24 hours" option. This option, when selected, may cause the next 24 hours of media asset identifiers to be generated for display by control circuitry 304, and may cause timeline 504 to correspond to those next 24 hours of media asset identifiers. In some embodiments, when control circuitry 304 detects a user selection of a "next 24 hours" option, control circuitry 304 may determine where media asset identifiers are scrolled to. For example, media asset identifiers may be scrolled to a time 10:30 AM. Control circuitry 304 may load the next 24 hours of media asset identifiers, but automatically scroll the loaded media asset identifiers of the next 24 hours to those corresponding to programming beginning at 10: AM. Control circuitry 304 may additionally cause a corresponding dot of timeline scroller 504 to be rendered more opaque, as described above.

In some embodiments, as a user scrolls timeline scroller 504, time indicator 506 from an initial position may scale down and/or fade out over a period of time. For example, as depicted in FIG. 5, time indicator 506 is depicted over a particular dot, and has a high opacity. The opacity and size of time indicator 506 may diminish after a fraction of a second passes when the user scrolls to a different dot. Another time indicator 506 that corresponds to the different dot may be displayed at the same time as a time indicator corresponding to the original dot, or may be displayed after the original time indicator disappears from display 312.

Figure 6:
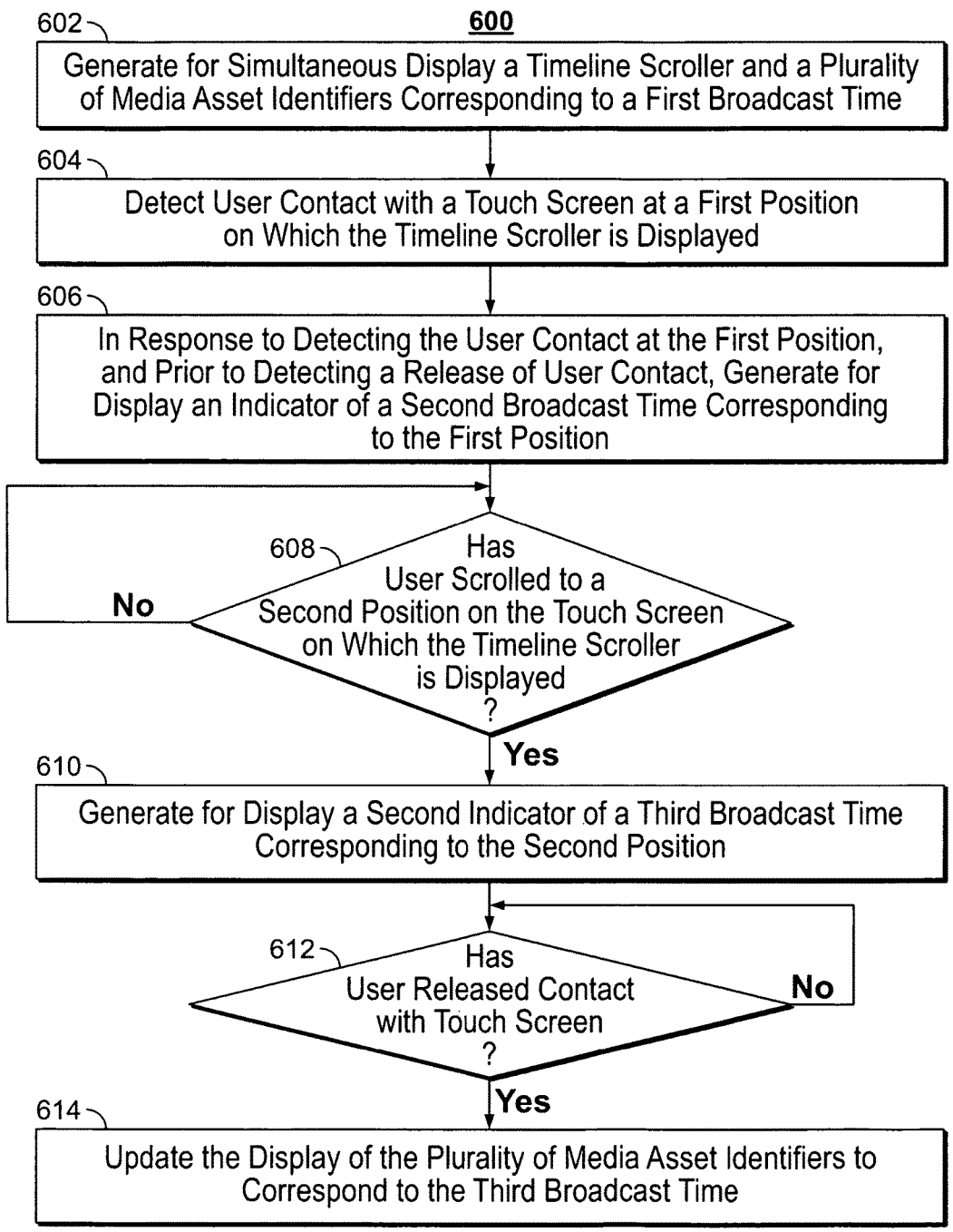
FIG. 6 depicts an illustrative flow chart that describes a process for implementing a timeline scroller for navigating media asset identifiers, in accordance with some embodiments of this disclosure.

FIG. 6 depicts an illustrative flow chart that describes a process for implementing a timeline scroller for navigating media asset identifiers, in accordance with some embodiments of this disclosure. Process 600 begins at 602, where control circuitry 304 may generate for simultaneous display a plurality of media asset listings corresponding to a first broadcast time and a timeline scroller. For example, a user of user equipment 500 may use the media guidance application to access media asset listings 502, and, responsively, control circuitry 304 may generate for display media asset listings 502. Control circuitry 304 may, for simultaneous display with media asset identifiers 502, generate for display timeline scroller 504. Attributes of timeline scroller 504 and media asset listings 502 discussed above and below are equally applicable in process 600.

Process 600 may continue to 604, where control circuitry 304 may detect user contact at a first position on which the timeline scroller is displayed. For example, user equipment 500 may include a touch screen (or other user input interface 310). Control circuitry 304 may detect user contact by way of user input interface 310, which, in this case, is a touch screen, and may determine that the point of contact is at a same point where a portion (e.g., a first position) of timeline scroller 504 is displayed.

Process 600 may continue to 606, where, in response to detecting the user contact at the first position, and prior to detecting a release of user contact, control circuitry 304 may generate for display an indicator of a second broadcast time corresponding to the first position. For example, as depicted in FIG. 5, about halfway down the timeline scroller, an indication of the time of 8:00 PM is displayed in time indicator 506. This may be the case because control circuitry 304 has detected that the position of the timeline scroller that a user has placed his finger on corresponds with the time 8:00 pm.

Process 600 may continue to 608, where control circuitry 304 determines whether it has detected that a user has scrolled to a second position on, e.g., the touch screen on which the timeline scroller is displayed. If no such detection has been made, control circuitry 304 may continue to monitor for such a detection. If control circuitry 304 does make such a detection, process 600 may continue to 610, where control circuitry 304 may responsively generate for display a second indicator of a third broadcast time corresponding to the second position. As an example, a user may scroll his finger downward, and as the user scrolls downward, time indicator 506 may indicate a time corresponding with the scrolled-to portion of timeline scroller 504.

Process 600 may continue to 612, where control circuitry 304 may determine whether a user has released contact with, e.g., the touch screen. If contact has not been released, control circuitry 304 may cause 612 to repeat, thus control circuitry 304 may continue to monitor for a release of contact. If control circuitry 304 does detect the release of user contact from user input interface 310 (e.g., a touch screen of user equipment 500), process 600 may continue to 614, where control circuitry 304 may responsively update the display of media asset identifiers 502 to correspond to the broadcast time indicated by time indicator 506. Control circuitry 304 may refrain from updating media asset identifiers 502 from their original display until such a time that control circuitry 304 detects, e.g., a removal of a user's finger from timeline scroller 504.

Figure 7:
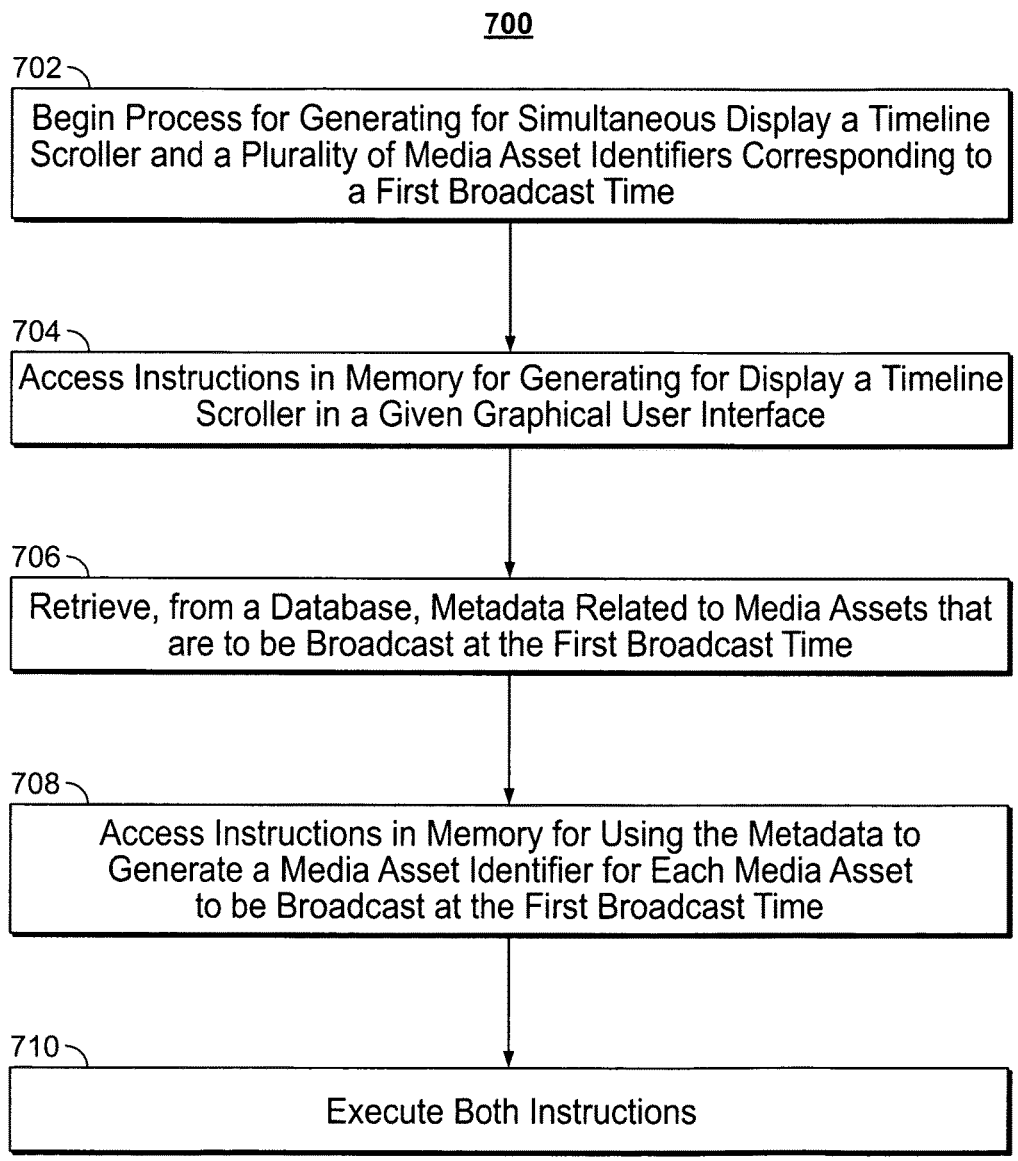
FIG. 7 depicts an illustrative flow chart that describes a process for generating for simultaneous display a timeline scroller and media asset identifiers, in accordance with some embodiments of this disclosure.

FIG. 7 depicts an illustrative flow chart that describes a process for generating for simultaneous display a timeline scroller and media asset identifiers, in accordance with some embodiments of this disclosure. Process 700 begins at 702, where control circuitry 304 may begin a process for generating for simultaneous display a timeline scroller and a plurality of media asset identifiers corresponding to a first broadcast time. Process 700 continues to 704, where control circuitry 304 may access instructions in memory (e.g., storage 308) for generating for display a timeline scroller in a given graphical user interface (e.g., the media consumption application depicted in FIG. 5).

Process 700 may continue to 706, where control circuitry 304 may retrieve, from a database (e.g., storage 308 or media guidance data source 418) metadata related to media assets that are to be broadcast at the first broadcast time. Process 700 may then continue to 708, where control circuitry 304 may access instructions from memory for using the metadata to generate a media asset identifier for each media asset to be broadcast at the first broadcast time. For example, control circuitry 304 may use the metadata to generate media asset identifiers 502. Process 700 may continue to 710, where control circuitry 304 may execute the instructions to yield, e.g., what is displayed on user equipment 500 in FIG. 5.

Figure 8:
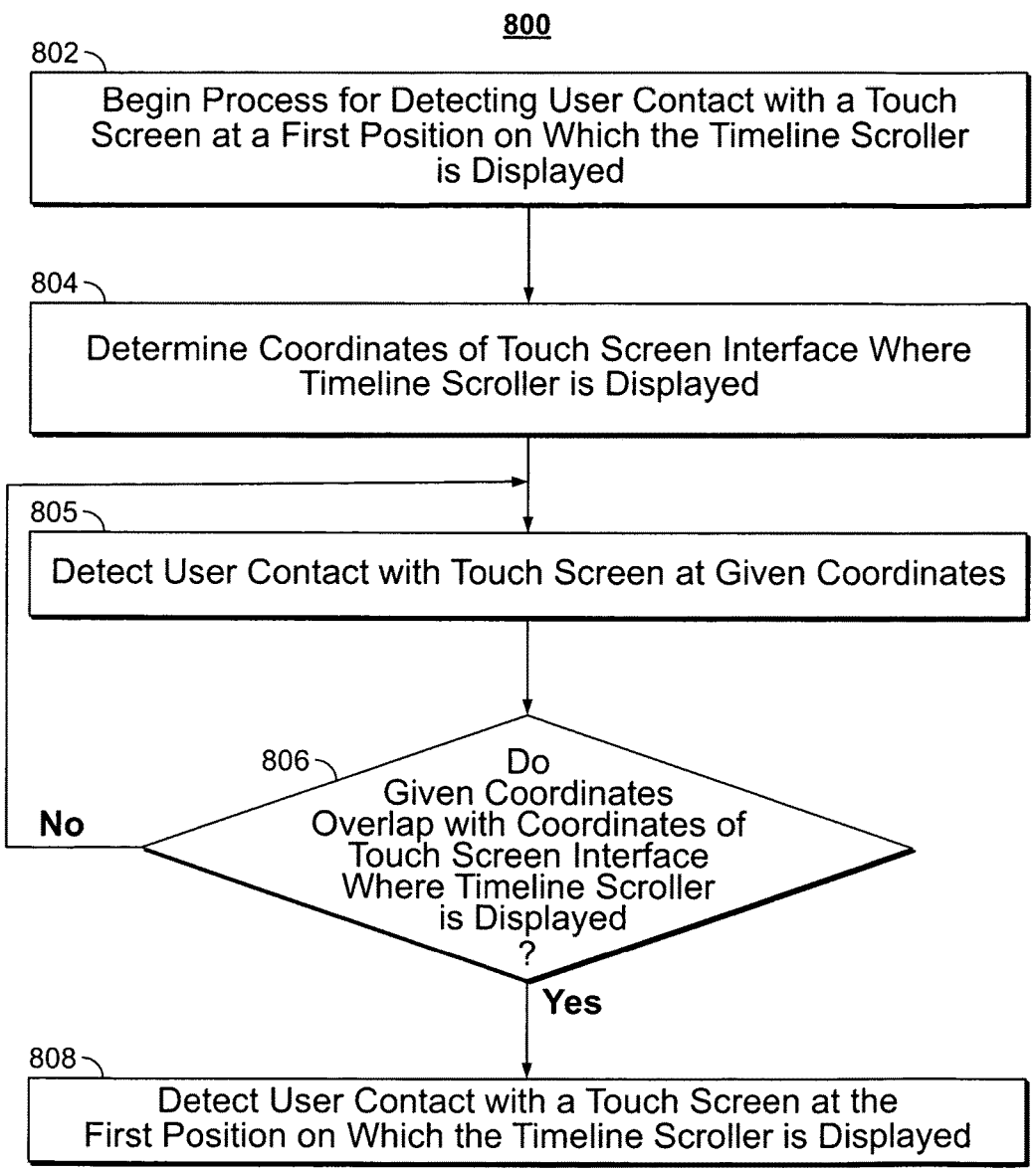
FIG. 8 depicts an illustrative flow chart that describes a process for detecting user contact with a timeline scroller, in accordance with some embodiments of this disclosure.

FIG. 8 depicts an illustrative flow chart that describes a process for detecting user contact with a timeline scroller, accordance with some embodiments of this disclosure. Process 800 begins at 802, where control circuitry 304 may begin a process for detecting user contact with a touch screen at a first position on which the timeline scroller is displayed. Process 800 may continue to 804, where control circuitry 034 may determine coordinates of an interface of the touch screen where timeline scroller 504 is displayed. For example, coordinates may correspond to X-Y grid points on the touch screen.

Process 800 may proceed to 805, where user contact with the touch screen is detected, and then to 806, where control circuitry 304 may determine whether a point where user contact occurs on the touch screen coincides with a coordinate of timeline scroller 504. If the points do not coincide, process 800 may revert to 805. If the points do coincide, process 800 may continue to 808, where control circuitry 304 may conclusively detect user contact with the touch screen at the first position on which the timeline scroller is displayed.

Figure 9:
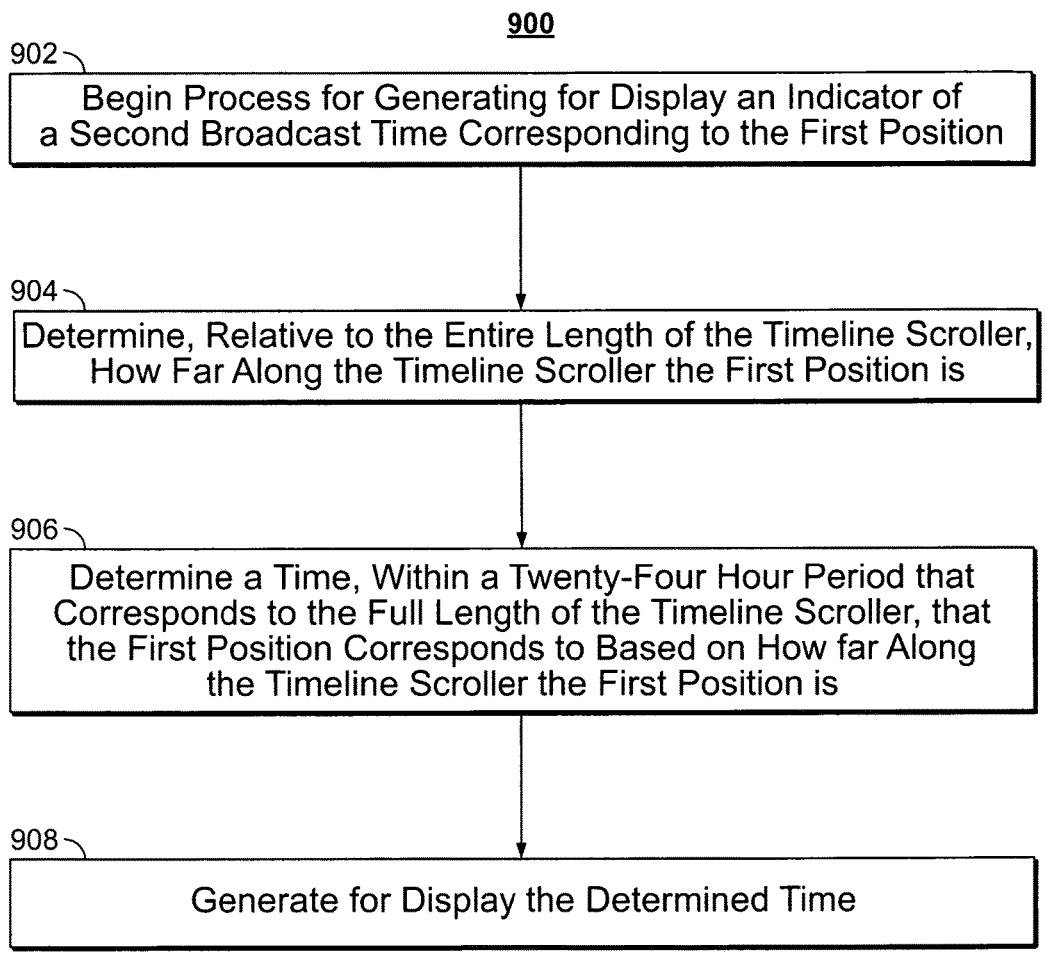
FIG. 9 depicts an illustrative flow chart that describes a process for indicating a broadcast time corresponding to a selected portion of a timeline scroller, in accordance with some embodiments of this disclosure.

FIG. 9 depicts an illustrative flow chart that describes a process for indicating a broadcast time corresponding to a selected portion of a timeline scroller, in accordance with some embodiments of this disclosure. Process 900 begins at 902, where control circuitry 304 may begin a process for generating for display an indicator of a second broadcast time corresponding to the first position. Process 900 continues to 904, where control circuitry 304 may determine, relative to the entire length of timeline scroller 504, how far along the timeline scroller the first position is. For example, the user may contact the timeline scroller one fourth of the way along the timeline scroller, and control circuitry 304 may responsively determine that the first position is one fourth of the way along timeline scroller 504.

Process 900 continues to 906, where control circuitry 304 may determine a time, within a twenty-four hour period that corresponds to the full length of the timeline scroller, that the first position corresponds to based on how far along the timeline scroller the first position is. For example, following the example above, if the timeline scroller represents a twenty-four hour period, and if the first position is twenty-five percent of the way down the timeline scroller, this may represent 6:00 am, because 6 hours from the beginning of the timeline scroller corresponds to twenty-five percent of a twenty-four hour period. Time periods other than twenty-four hour periods are within the scope of this disclosure. Process 900 may continue to 908, where control circuitry 304 may generate for display the determined time (e.g., by way of indicator 506).

Figure 10:
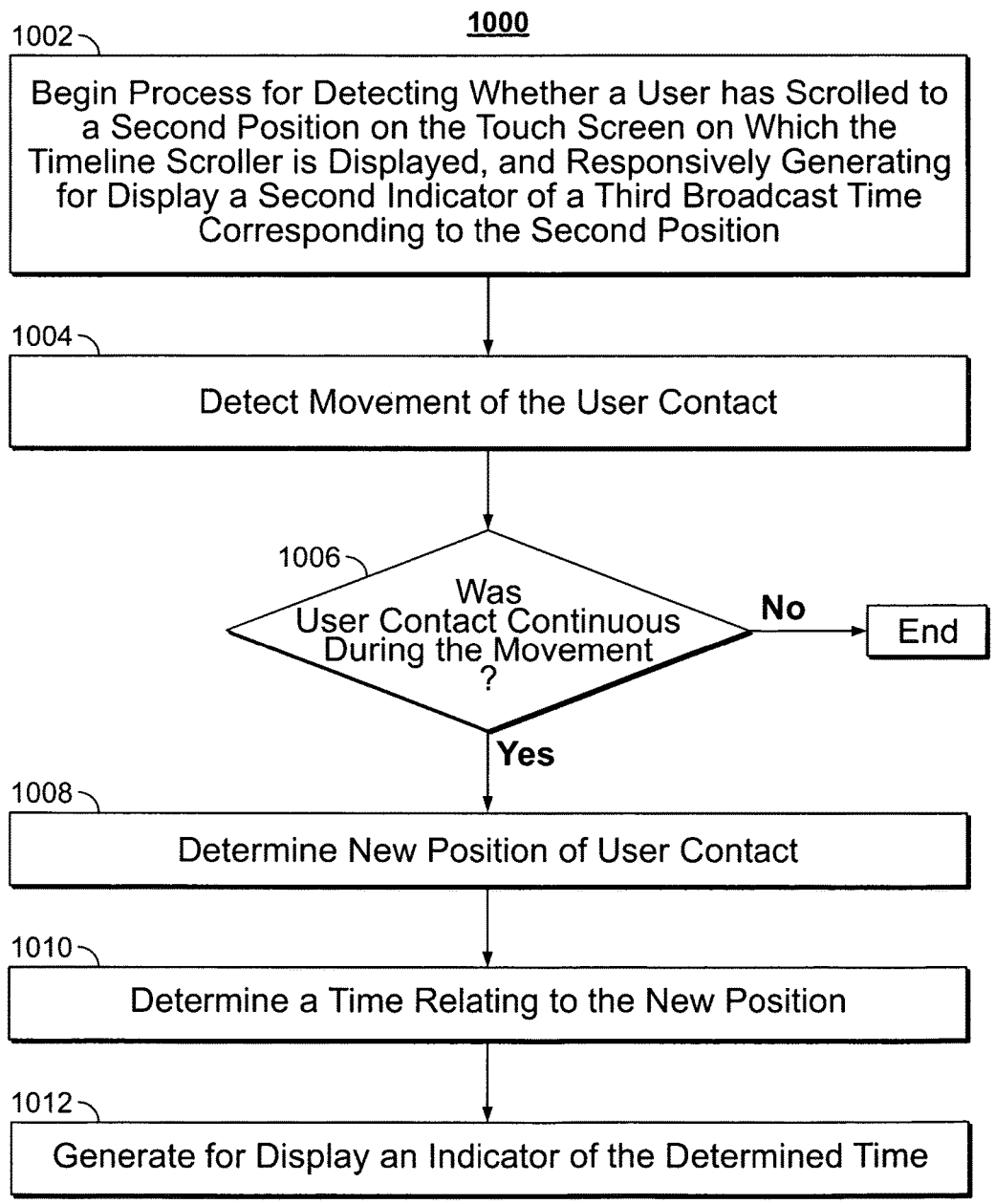
FIG. 10 depicts an illustrative flow chart that describes a process for processing movement of a user's contact along a timeline scroller, in accordance with some embodiments of this disclosure.

FIG. 10 depicts an illustrative flow chart that describes a process for processing movement of a user's contact along a timeline scroller, in accordance with some embodiments of this disclosure. Process 1000 begins at 1002, where control circuitry 304 may begin a process for detecting whether a user has scrolled to a second position on the touch screen on which the timeline scroller is displayed, and responsively generating for display a second indicator of a third broadcast time corresponding to the second position. Process 1000 may continue to 1004, where control circuitry 304 may detect movement of the user contact (e.g., along timeline scroller 504).

Process 1000 may continue to 1006, where control circuitry 304 may determine whether user contact was continuous (i.e., the user did not remove his finger from the touch screen) during the movement. If the user removed his finger from the touch screen, process 1000 may end. If the user did not remove his finger, process 1000 may continue to 1008, where control circuitry 304 may determine a new position of user contact (e.g., the position that the user moved his finger to). Process 1000 may continue to 1010, where control circuitry 304 may determine a time corresponding to the new position (e.g., in any manner described above and below for determining a time corresponding to a position of timeline scroller 504). Process 1000 may then continue to 1012, where control circuitry 304 may generate for display an indicator of the determined time (e.g., by way of indicator 506).

Figure 11:
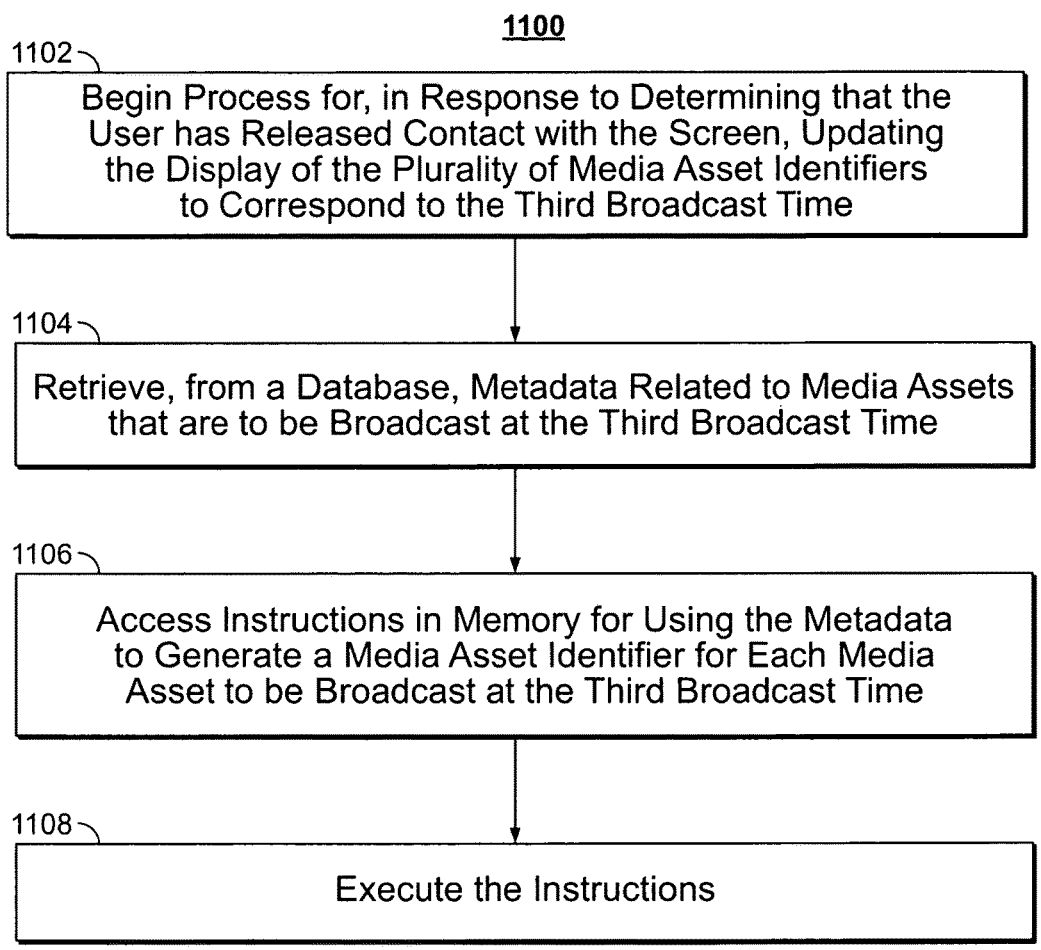
FIG. 11 depicts an illustrative flow chart that describes a process for loading media asset identifiers that correspond to a point of a timeline scroller from which a user has released contact, in accordance with some embodiments of this disclosure.

FIG. 11 depicts an illustrative flow chart that describes a process for loading media asset identifiers that correspond to a point of a timeline scroller from which a user has released contact, in accordance with some embodiments of this disclosure. Process 1100 begins at 1102, where control circuitry 304 may begin a process for, in response to determining that the user has released contact with the screen, updating the display of the plurality of media asset identifiers to correspond to the third broadcast time. Process 1100 continues to 1104, where control circuitry 304 may retrieve, from a database (e.g., media guidance data source 418), metadata related to media assets that are to be broadcast at the third broadcast time. Metadata retrieval techniques described above and below are equally applicable to process 1100.

Process 1100 may continue to 1106, where control circuitry 304 may access instructions in memory for using the metadata to generate a media asset identifier for each media asset to be broadcast at the third broadcast time. At 1108, control circuitry 304 may execute the instructions. Similar processes were described in detail above and below and are equally applicable here.

It should be noted that processes 600-1100 or any step thereof could be performed on, or provided by, any of the devices shown in FIGS. 3-5. For example, any of processes 600-1100 may be executed by control circuitry 304 (FIG. 3) as instructed by control circuitry implemented on user equipment 402, 404, and/or 406 (FIG. 4) in order to implement the timeline scroller as described herein. In addition, one or more steps of processes 600-1300 may be incorporated into or combined with one or more steps of any other process or embodiment.

It is contemplated that the steps or descriptions of each of FIGS. 6-11 may be used with any other embodiment of this disclosure. In addition, the steps and descriptions described in relation to FIGS. 6-11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIGS. 6-13.

While the exemplary embodiment disclosed herein is illustrated using broadcast listings, unscheduled media assets are within the scope of this disclosure. Moreover, while a touch screen is used to illustrate the disclosures herein, any means of interacting with a timeline scroller are within the scope of this disclosure.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, determining that a user has scrolled along the timeline scroller may be performed by circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, metadata, as described herein, may be stored in, and retrieved from, storage 308 of FIG. 3, or media guidance data source 418 of FIG. 4. Furthermore, processing circuitry, or a computer program, may update settings associated with a user, such as a user profile, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for implementing a timeline scroller in a touch screen application environment for seamlessly navigating broadcast media asset identifiers, the method comprising:
generating for simultaneous display a timeline scroller and a plurality of media asset identifiers corresponding to a first broadcast time;
detecting user contact with a touch screen at a first position on the timeline scroller;
in response to detecting the user contact at the first position, and prior to detecting a release of user contact from the timeline scroller:
generating for display a first indicator of a second broadcast time corresponding to the first position at a first level of prominence,
detecting that a user has scrolled to a second position on the touch screen on which the timeline scroller is displayed, and
in response to detecting that the user has scrolled to the second position:
generating for display a second indicator of a third broadcast time corresponding to the second position at the first level of prominence;
determining a distance between the first position and the second position;
based on the distance, computing a second level of prominence for the first indicator that is less than the first level of prominence;
generating for display the first indicator at the second level of prominence;
determining that a threshold period of time has elapsed since a time that the user contact with the first position was last detected; and
in response to determining that the threshold period of time has elapsed since the time that the user contact with the first position was last detected and prior to the release of the user contact from the timeline scroller, causing the first indicator to no longer be displayed;
detecting the release of user contact; and
in response to detecting the release of user contact, updating the display of the plurality of media asset identifiers to correspond to the third broadcast time.

2. The method of claim 1, further comprising:
determining that the user has scrolled a threshold distance from the first position; and
in response to determining that the user has scrolled a threshold distance from the first position, causing the first indicator to no longer be displayed.

3. The method of claim 2, wherein the timeline scroller corresponds to a first period of time, and wherein the method further comprises:
generating for display a selectable option for the timeline scroller to correspond to a different period of time than it presently corresponds to;
receiving a user selection of the selectable option; and
in response to receiving the user selection, causing the timeline scroller to correspond to the different period.

4. The method of claim 3, wherein the plurality of media asset identifiers corresponding to the broadcast time additionally correspond to the period of time that the timeline scroller presently corresponds to, and wherein the method further comprises:
generating for display a different plurality of media asset identifiers corresponding to the broadcast time in the different period of time.

5. The method of claim 1, wherein the method further comprises, further in response to detecting user contact with a touch screen at a first position on which the timeline scroller is displayed, causing the first position of the timeline scroller to be displayed more prominently than other positions of the timeline scroller are displayed.

6. The method of claim 5, wherein the method further comprises, further in response to detecting that the user has scrolled to the second position, causing the prominence of the first position of the timeline scroller to be reduced to a uniform prominence with the other positions of the timeline scroller.

7. The method of claim 6, wherein the method further comprises, further in response to detecting that the user has scrolled to the second position, causing the prominence of the second position of the timeline scroller to be displayed more prominently than the other positions of the timeline scroller and the first position of the timeline scroller are displayed.

8. The method of claim 1, wherein the timeline scroller is an overlay above the plurality of media asset identifiers, and does not display textual information of broadcast times.

9. The method of claim 8, wherein the timeline scroller displays an indicator of a broadcast time either in response to detecting that the user has made contact with the timeline scroller, or in response to detecting that the user has scrolled to a position on the timeline scroller.

10. A system for implementing a timeline scroller in a touch screen application environment for seamlessly navigating broadcast media asset identifiers, the system comprising:
control circuitry configured to:
generate for simultaneous display a timeline scroller and a plurality of media asset identifiers corresponding to a first broadcast time;
detect user contact with a touch screen at a first position on the timeline scroller;
in response to detecting the user contact at the first position, and prior to detecting a release of user contact from the timeline scroller:
generate for display a first indicator of a second broadcast time corresponding to the first position at a first level of prominence,
detect that a user has scrolled to a second position on the touch screen on which the timeline scroller is displayed, and
in response to detecting that the user has scrolled to the second position:
generate for display a second indicator of a third broadcast time corresponding to the second position at the first level of prominence;
determine a distance between the first position and the second position;
based on the distance, compute a second level of prominence for the first indicator that is less than the first level of prominence;
generate for display the first indicator at the second level of prominence;
determine that a threshold period of time has elapsed since a time that the user contact with the first position was last detected; and
in response to determining that the threshold period of time has elapsed since the time that the user contact with the first position was last detected and prior to the release of the user contact from the timeline scroller, cause the first indicator to no longer be displayed;
detect the release of the user contact; and
in response to detecting the release of the user contact, update the display of the plurality of media asset identifiers to correspond to the third broadcast time.

11. The system of claim 10, wherein the control circuitry is further configured to:
determine that the user has scrolled a threshold distance from the first position; and
in response to determining that the user has scrolled a threshold distance from the first position, cause the first indicator to no longer be displayed.

12. The system of claim 11, wherein the timeline scroller corresponds to a first period of time, and wherein the control circuitry is further configured to:
generate for display a selectable option for the timeline scroller to correspond to a different period of time than it presently corresponds to;
receive a user selection of the selectable option; and
in response to receiving the user selection, cause the timeline scroller to correspond to the different period.

13. The system of claim 12, wherein the plurality of media asset identifiers corresponding to the broadcast time additionally correspond to the period of time that the timeline scroller presently corresponds to, and wherein the control circuitry is further configured to:
generate for display a different plurality of media asset identifiers corresponding to the broadcast time in the different period of time.

14. The system of claim 10, wherein the system is further configured to, further in response to detecting user contact with a touch screen at a first position on which the timeline scroller is displayed, cause the first position of the timeline scroller to be displayed more prominently than other positions of the timeline scroller are displayed.

15. The system of claim 14, wherein the control circuitry is further configured to, further in response to detecting that the user has scrolled to the second position, cause the prominence of the first position of the timeline scroller to be reduced to a uniform prominence with the other positions of the timeline scroller.

16. The system of claim 15, wherein the control circuitry is further configured to, further in response to detecting that the user has scrolled to the second position, cause the prominence of the second position of the timeline scroller to be displayed more prominently than the other positions of the timeline scroller and the first position of the timeline scroller are displayed.

17. The system of claim 10, wherein the timeline scroller is an overlay above the plurality of media asset identifiers, and does not display textual information of broadcast times.

18. The system of claim 17, wherein the timeline scroller displays an indicator of a broadcast time either in response to detecting that the user has made contact with the timeline scroller, or in response to detecting that the user has scrolled to a position on the timeline scroller.

* * * * *